(12) United States Patent
Schaefer (10) Patent No.: US 6,804,228 B1
(45) Date of Patent: Oct. 12, 2004

(54) METHOD FOR TRANSMITTING DATA VIA A NUMBER OF INTERFACES

(75) Inventor: Stefan Peter Schaefer, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/393,566

(22) Filed: Sep. 10, 1999

(51) Int. Cl.[7] .......................... H04L 12/50; H04Q 11/00
(52) U.S. Cl. .................. 370/382; 370/395.71; 370/229; 710/52; 710/57
(58) Field of Search .................. 370/412, 428, 370/429, 413, 382, 395.71, 395.72, 229; 711/147, 152, 171; 710/52–57

(56) References Cited

U.S. PATENT DOCUMENTS

| | | | |
|---|---|---|---|
| 4,788,679 A | | 11/1988 | Kataoka et al. |
| 5,537,402 A | | 7/1996 | Notani et al. |
| 5,784,699 A | * | 7/1998 | McMahon et al. .......... 711/171 |
| 5,805,590 A | | 9/1998 | Gillard et al. |
| 6,128,307 A | * | 10/2000 | Brown ........................ 370/412 |
| 6,219,728 B1 | * | 4/2001 | Yin .............................. 710/52 |
| 6,310,884 B1 | * | 10/2001 | Odenwald, Jr. ............. 370/412 |

FOREIGN PATENT DOCUMENTS

| | | |
|---|---|---|
| DE | 37 28 805 | 5/1988 |
| EP | 0 432 346 A1 | 6/1991 |
| GB | 2 060 318 A | 4/1981 |
| GB | 2 298 109 A | 8/1996 |
| GB | 2 301 751 A | 12/1996 |
| WO | WO 94/02898 | 2/1994 |
| WO | WO 99/28816 | 10/1999 |

* cited by examiner

Primary Examiner—Wellington Chin
Assistant Examiner—Raj Jain
(74) Attorney, Agent, or Firm—Shaw Pittman LLP

(57) ABSTRACT

The present invention is directed to a method for transmitting data via a number of interfaces arranged in parallel. The interfaces respectively have a receiver unit for receiving data packets and for intermediate storage of these data packets and have a transmitter unit for sending data packets. Further, an overall buffer memory is provided for the number of interfaces. The inventive method discloses an allocation of buffer memory capacity of the overall buffer memory for the receiver unit of every interface upon initialization, the transmission of a data packet to a receiver unit of an interface from a communication unit, the intermediate storage of the data packet transmitted to a receiver unit in the buffer memory space allocated to the receiver unit and the request of further buffer memory capacity at a memory location manager, the allocation of the further, requested buffer memory capacity for the requesting receiver unit by the memory location manager, the transmission of the memory capacity space allocation to a transmitter unit, the transmission of the intermediately stored data packet by the transmitter unit, and the release of the buffer memory location of the transmitted data packet, so that this buffer memory location of the overall buffer memory can be re-assigned by the memory capacity manager.

22 Claims, 4 Drawing Sheets

METHOD FOR TRANSMITTING DATA VIA A NUMBER OF INTERFACES

BACKGROUND OF THE INVENTION

The present invention is directed to a method for transmitting data via a number of interfaces arranged in parallel, whereby each interface comprises a receiver unit for receiving data packets and for intermediately storing these data packets and comprises a transmitter unit for sending data packets.

In order to enable data traffic between a number of communication units, interfaces are provided between these communication units. Such interfaces respectively comprise a receiver unit that receives data packets of a communication unit and further comprises a transmitter unit that sends the received data packets to a different communication unit. Further, means for intermediate storage of data packets are provided in the interface because of different degrees of data incidence at the interface and due to a limited transmission capacity of the interface.

Each interface must be able to transmit high data rates of up to more than 10 Mbit/s. Neither a data loss nor a noticeable delay in the data transmission dare thereby occur.

In order to meet these demands, a buffer memory of a specific, defined size was previously disclosed for each interface. The size of the buffer memory was dimensioned such that, even given an extremely great data incidence at the receiver unit of the respective interface, the received data packets could always be intermediately stored until they had been sent by a transmitter unit of an interface. Since the buffer memories of the respective interfaces are statically allocated, if data packets that are stored in the buffer memory of the receiver unit of an interface are to be sent by the transmitter unit of a different interface, a copy onto the buffer memory of a different interface from the buffer memory of an interface must be made before the transmission by the transmitter unit of the other interface.

This known solution for the transmission of data exhibits the following disadvantages: the total buffer memory space made available is very inefficiently utilized. For example, relatively low data transmission rates can usually arise at a first interface, by contrast whereto extremely high data transmission rates usually arise at a second interface. When the same buffer memory space is always made available to each interface in this case, the buffer memory space of the first interface will usually be empty, resulting in a waste of memory space. Even when, however, a buffer memory of a smaller size is made available to the first interface in such a case, this possibility is inflexible and can lead to problems when, for example, an unusually high data occurrence arises by way of exception at the first interface. In such a case, the first interface cannot intermediately store all arising data, so that data loss occurs.

SUMMARY OF THE INVENTION

An object of the present invention is to offer a method for transmitting data via a number of interfaces arranged in parallel wherein a data loss can be prevented and, simultaneously, the buffer memory space made available for the interfaces is efficiently and flexibly utilized.

This object is achieved in accordance with the invention is a method for transmitting data via a number of interfaces arranged parallel that respectively comprise a receiver unit for receiving data packets and for intermediately storing these data packets and comprise a transmitter unit for sending data packets, wherein an overall buffer memory is provided for the number of interfaces. The method comprises the following steps: buffer memory capacity of the overall buffer memory is allocated to the receiver unit of each interface in an initialization; a data packet is transmitted to a receiver unit of an interface by a communication unit. The data packet transmitted to a receiver unit is intermediately stored in the buffer memory location allocated to the receiver unit, and a further buffer memory location is requested at a memory location manager. The further, requested buffer memory location is allocated to the requesting receiver unit by the memory location manager. The buffer memory location allocation is transmitted to a transmitter unit. The intermediately stored data packet is sent from this transmitter unit. Subsequently, the buffer memory location of the transmitted data packet is released, so that this buffer memory location of the overall buffer memory can be re-allocated by the memory location manager.

What is advantageous about the inventive method is that the buffer memory location allocated to each interface is dynamically and automatically adapted to the given conditions. Whenever a receiver unit makes use of buffer memory space, this receiver unit requests further buffer memory capacity. As a result thereof, the buffer memory space made available at the initialization can be minimized for the receiver unit, since, if this receiver unit must receive a greater amount of data, it has further memory space allocated to it. Since, further, the receiver and transmitter units of each interface access an overall buffer memory, data packets, which are received by the receiver unit of an interface and are to be sent by a transmitter unit of a different interface, no longer need to be copied between different buffer memories. A possible source of error is thereby suppressed. Further, a loss of data given an extremely high data occurrence at the receiver unit of an interface is largely precluded, since this receiver unit can theoretically make use of the entire buffer memory capacity that is provided for all interfaces.

Advantageously, a specific, minimum size of free buffer memory capacity can be allocated to each receiver unit at any time. This assures that each receiver unit always has a certain reserve of free buffer memory capacity.

In a further embodiment of the invention, the overall buffer memory is divided into overall buffer memory parcels, whereby one or more overall buffer memory parcels are respectively allocated to the receiver units.

Further, the receiver units can comprise pointer lists that contain the allocated buffer memory location and in which a pointer that indicates where the intermediately stored data packet is stored in the overall buffer memory is entered in the buffer memory location given intermediate storage of the data packet transmitted to a receiver unit.

What is advantageous about this embodiment is that the division into parcels simplifies the memory location manager. Further, the concept of pointer lists for the receiver units is advantageous in that the receiver units only contain information about the memory capacity allocated to them and the addresses of the intermediately stored data packets.

Further, the transmitter units can also comprise pointer lists into which the buffer memory space allocation transmitted from the receiver unit is entered. What is advantageous about this is that the receiver unit only has to transmit the list entry with the address of the intermediately stored data packet to the transmitter unit and not the data packets themselves.

Advantageously, the pointer lists contain status markers in addition to each pointer with information about a status of segments of the list to which the pointer points, and contain a length indicator that indicates the length of the intermediately stored data to which the pointer points.

Given a division of the overall buffer memory capacity into parcels, the size of a data packet can be dimensioned such that it can only be intermediately stored in a number of overall buffer memory parcels. In such a case, the buffer memory space allocation of the parcels occupied firs: is only transmitted to the transmitter unit when all data packets of the data packet covering a number of parcels have been received by the receiver unit. Since the information about the size of the data packet is always only contained at the end in data packets, the receiver unit can only decide whether it has completely received the data packet after reception of this last part of the data packet. If the receiver unit already transmits the first part of the data packet in the first parcels to the transmitter unit after the intermediate storage of this first part, a correction would be extremely difficult given an incomplete reception, which could only be identified by the receiver unit after reception of the complete data packet, since parts of the data packet have already been sent to the transmitter unit and have already potentially been sent from the latter.

Further, the memory capacity manager can comprise occupancy lists that contain information about the occupation of the overall buffer memory parcels of the overall buffer memory. As a result of such occupancy lists, it becomes simpler for the memory location manager to identify location and size of the free memory capacity of the overall buffer memory.

If the transmission of the buffer memory capacity allocation from a receiver unit of an interface to a specific transmitter unit is not possible, the buffer memory capacity allocation of this receiver unit is given back to the memory location manager and is entered into a FIFO list in the memory location manager in an embodiment of the present invention. After a transmission to the specific transmitter unit is possible again, the memory location manager transmits the buffer memory capacity allocation to this transmitter unit from the FIFO list.

A case can occur in the data transmission that a specific transmitter unit is blocked but other transmitter units can send. When a receiver unit receives data packets both for the blocked transmitter unit as well as for transmitter units that are not blocked, a problem arises that the data packets for the blocked transmitter unit backup in the transmitter units. Due to the rerouting of the buffer memory space allocation of these data packets intended for the blocked transmitter unit, each receiver unit that wishes to transmit buffer memory space allocations to the blocked transmitter unit is relieved. At the same time, it is assured with the memory location manager that, when the previously blocked transmitter unit is again ready to transmit, the memory capacity allocation for these data packets is transmitted to this transmitter unit in sequence.

The memory location manager can have provided a FIFO list for each interface, whereby this always either comprises a specific buffer memory location or the buffer memory location for each FIFO list can be allocated variably and dependent on the corresponding need of the respective FIFO list for buffer memory capacity.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
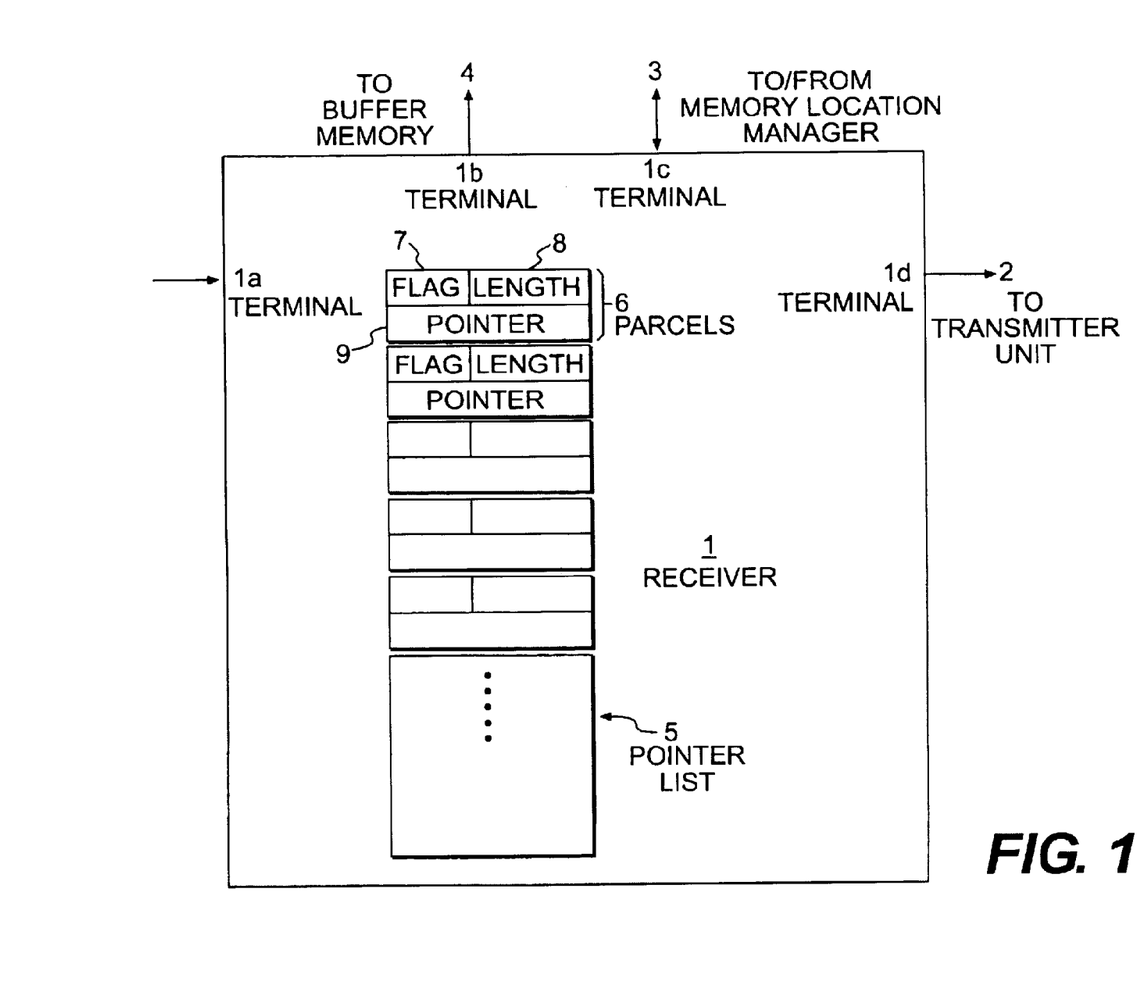
FIG. 1 is a schematic block diagram of the structure and the connections of the receiver unit.

FIG. 1 schematically shows the structure and the connections of a receiver unit 1. The receiver unit 1 comprises a terminal 1a via which it receives data packets from a transmitting communication means (not shown). Via a terminal 1b, the receiver unit 1 transmits the data packets received via the terminal 1a to an overall buffer memory 4. Via a terminal 1c, the receiver unit 1 receives signals from a memory location manager 3 that informs the receiver unit 1 where it can intermediately store data packets in the overall buffer memory 4.

The receiver unit 1 comprises a pointer list 5 that is divided into parcels 6.

A status mark 7 (flag), a length indicator 8 (length) and a pointer 9 is entered into each parcel 6. The status marker 7 contains information about the status of the respective parcel 6. For example, it can be stored therein whether the pointer 9 of the respective parcel 6 refers to free memory capacity of the overall buffer memory 4 assigned by the memory location manager 3 or whether the pointer 9 points to a parcel 6 of the overall buffer memory 4 in which a data packet has been stored by the receiver unit 1. The length indicator 8 contains information about the length of the data intermediately stored in the overall buffer memory 4. The pointer 9 contains an address of the overall buffer memory 4. It can thereby point to free memory capacity available to the receiver unit 1 or indicate the address at which the receiver unit 1 has stored data packets.

In the initialization of the receiver unit 1, the memory capacity management 3 allocates a plurality of parcels of the overall buffer memory 4 to it. The addresses of this allocated buffer memory capacity are entered at the pointers 9 in the parcels 6 of the pointer list 5.

Memory space allocations that are retained in a parcel 6 of the pointer list 5 are transmitted to a transmitter unit 2 via a terminal 1d of the receiver unit 1. Only those memory space allocations that refer to memory capacity in which data packets have been intermediately stored by the receiver unit 1 are transmitted to the transmitter unit 2. This can be identified with the status mark 7. When a memory capacity allocation, i.e. a parcel 6 of the pointer list 5, has been transmitted to a transmitter unit 2, the corresponding parcel 6 of the receiver unit 1 is erased. When, on the other hand, a data packet received by a communication equipment via the terminal 1a is stored in a parcel 6 of the overall buffer memory 4 in a memory space assigned to the receiver unit 1 via the terminal 1b, the status mark 7 of a parcel 6 changes such that it is now indicated that the pointer 9 of this parcel 6 points to the address of an intermediately stored data packet.

As a result of this storing of a data packet in the overall buffer memory 4, the buffer memory capacity that is available to the receiver unit 1 is reduced. For this reason, the receiver unit 1 can request further buffer memory capacity from the memory location manager 3. This request is granted by the memory location manager 3 in that it assigns further buffer memory capacity of the overall buffer memory 4 to the receiver unit 1 via the terminal 1c. The address of this newly allocated memory capacity is deposited in a pointer 9 of a parcel 6 of the pointer list 5 that has not yet been occupied and is noted in the corresponding status mark 7, to wit that the pointer 9 points to buffer memory capacity that is still available. The buffer memory capacity allocated to the receiver unit 1 during the initialization is thus preserved at any time.

The pointer 9 of every parcel 6 of the pointer list 5 points to an address of a parcel of the main buffer memory 4. A parcel of the main buffer memory 4 comprises a specific size of buffer memory capacity. The data packets that are received by the receiver unit 1 via the terminal 1a can potentially demand more buffer memory capacity than has been available to it by a parcel of the overall buffer memory 4. Such large data packets are thus stored in a number of parcels of the overall buffer memory 4, so that a number of parcels 6 of the pointer list 5 are also made use of in order to point to the respective parcels of the overall buffer memory 4 with the pointer 9. This could lead to the fact that the beginning of this data packet, the memory space allocation of this beginning to be more precise, is transmitted to a transmitter unit 2 via the terminal id before the end of a data packet has been received by the receiver unit 1. Since, however, the receiver unit 1 can only decide on the basis of the end of each data packet whether the reception ensued completely and error-free, the problem can derive given a faulty reception that a transmission of the beginning of this data packet by a transmitter unit 2 can no longer be prevented by the receiver unit 1. For this reason, the receiver unit 1 always waits for the reception of the end of a data packet before it transmits the memory space allocation of the start of the data packet to a transmitter unit 2. For this reason, the buffer memory capacity allocated in the initialization should be dimensioned of such a size for the receiver unit 1 that a single data packet from the receiver unit 1 can be intermediately stored in the overall buffer memory 4 in any case.

Figure 2:
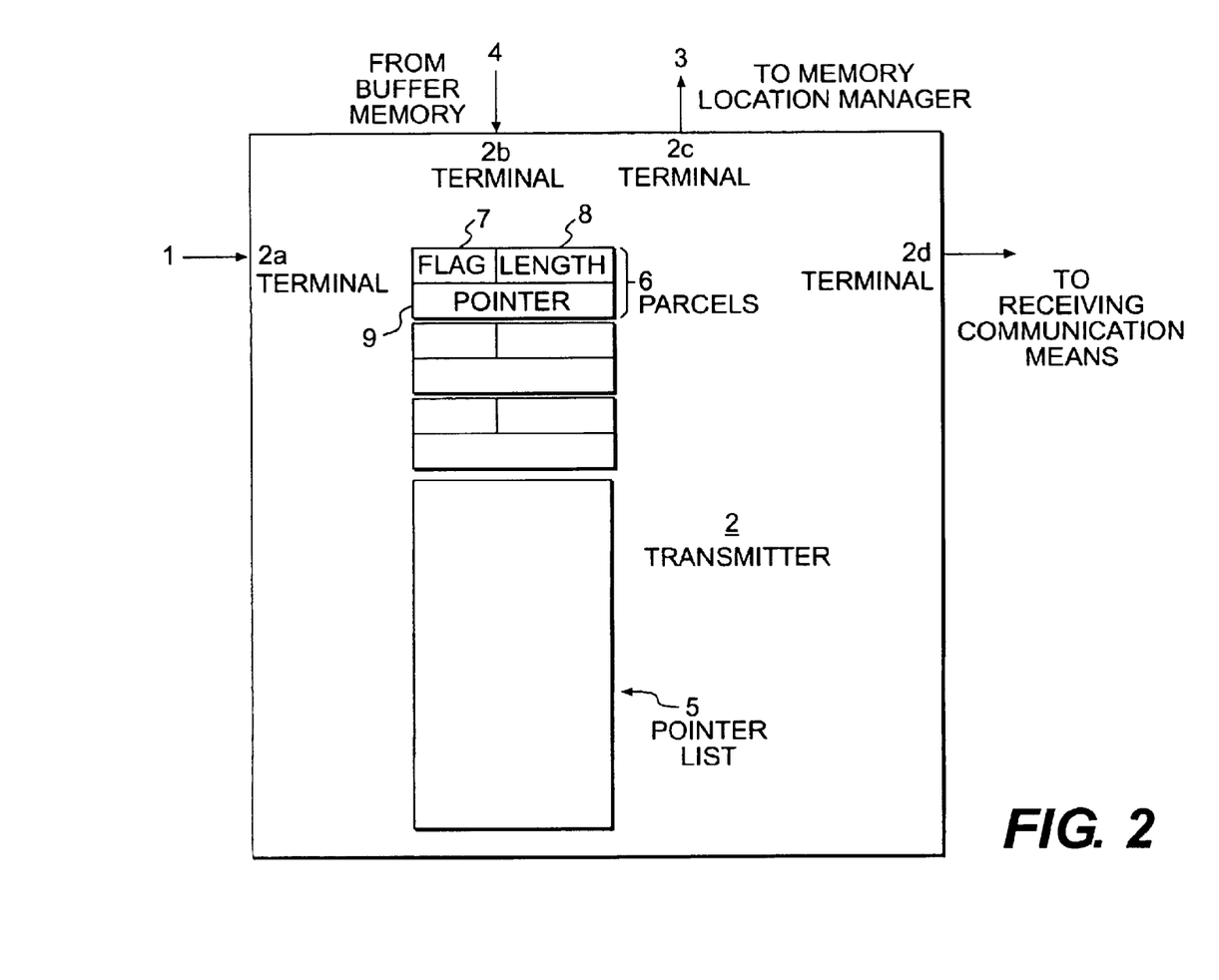
FIG. 2 is a schematic block diagram of the structure and the connections of the transmitter unit.

FIG. 2 schematically shows the structure and the connections of a transmitter unit 2. Via the terminal 2a, the transmitter unit 2 has memory space allocations transmitted to it from a receiver unit 1. These memory space allocations are deposited in a pointer list 5 of the transmitter unit 2. The pointer list 5 of the transmitter unit 2 is constructed in exactly the same way as the pointer list 5 of the receiver unit 1, so that it need not be explained in greater detail.

The transmitter unit 2 transmits to a receiving communication means (not shown) via a terminal 2d. To this end, data packets are transmitted to it from the overall buffer memory 4 via a terminal 2b. The addresses of the data packets transmitted from the main buffer memory 4 respectively derive from the pointer 9 of a parcel 6 of the pointer list 5. When a data packet that was stored in a parcel of the overall buffer memory 4 and that had the address to which a pointer 9 of a parcel 6 of the transmitted unit 2 pointed has been transmitted via the terminal 2d to a receiving communication means (not shown), this is communicated to the memory location manager 3 via the terminal 2c of the transmitter unit 2. As a result thereof, the memory location manager 3 is informed that the buffer memory space that was occupied by the data packet sent by the transmitter unit 2 is no longer required and can thus be reassigned to a receiver unit 1 by the memory location manager. After a data packet has been sent from the transmitter unit 2, the entries of the corresponding parcels 6 are deleted.

The inventive method shall now be explained in greater detail with reference to FIG. 3. In the method, data packets are to be transmitted via a number of interfaces. Each interface comprises a receiver unit 1 and a transmitter unit 2. These two units were respectively explained above with reference to FIG. 1 or FIG. 2.

The interfaces are networked with one another such that each receiver unit 1 of a specific interface can transmit memory space allocations to each transmitter unit 2 of every interface. This is illustrated by the connections 11 of FIG. 3.

Figure 3:
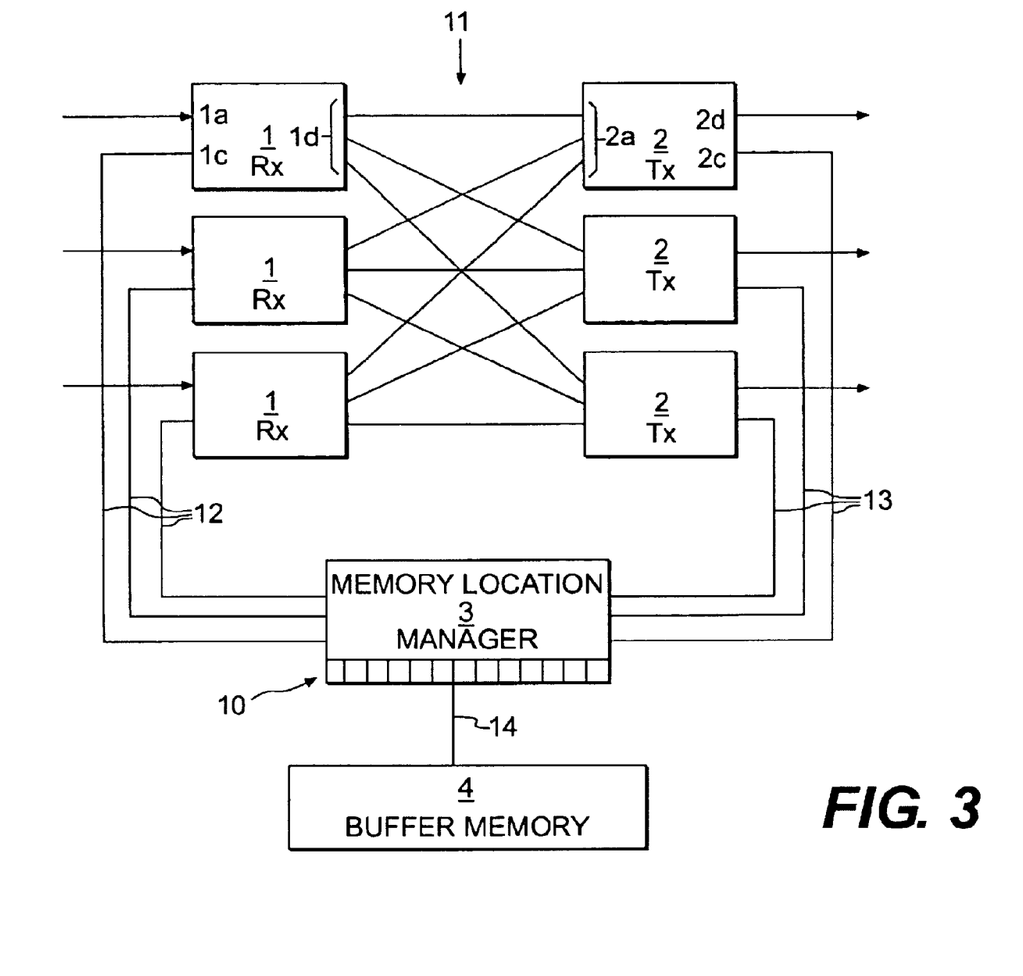
FIG. 3 is a block diagram for explaining the inventive method for the transmission of data via a number of interfaces.

It is noted that, given the assistance of FIG. 3, only the memory location management in the inventive method is to be explained, so that all connections are not entered in FIG. 3. For example, it follows from FIG. 2 that a transmitter unit 2 can receive data packets from the overall buffer memory 4 via the terminal 2b and can send these data packets to a receiving communication means (not shown) via the terminal 2d. This connection is not shown in FIG. 3 for the sake of a clearer illustration.

As already described above, the receiver unit 1 receives data packets from a transmitting communication unit (not shown) via its terminal 1a. Subsequently, the receiver unit 1 transmits this data packet to the overall buffer memory 4 via a connection 1b (FIG. 1). The receiver units 1 can request further buffer memory capacity from the memory location manager 3 via the lines 12.

The memory location manager 3 contains occupancy lists 10 that contain information about the occupation of overall buffer memory parcels of the overall buffer memory 4. For example, an occupancy list can cover 32 bits, whereby an entry of "1" means that the overall buffer memory parcel belonging to this bit is free, and an entry of "0" means that this parcel is occupied. On the basis of these occupancy lists 10, the memory location manager 3 can identify buffer memory capacity that is still free and the addresses of the overall buffer memory parcels that are still free in a simple way.

When a receiver unit 1 has requested further buffer memory capacity from the memory location manager 3 via the line 12, the memory location manager 3 identifies an address of a parcel of the overall buffer memory that is still free on the basis of the occupancy lists 10. The memory location manager 3 communicates this address to the requesting receiver unit 1 via the line 12 and modifies the corresponding bit of an occupancy list 10 such that it follows that the corresponding parcel of the overall buffer memory 4 has now been assigned.

As already explained, the receiver unit 1 transmits the memory space allocation of a data packet to the transmitter unit 2 of the interface via which the corresponding data packet is to be sent, transmitting this via the terminal 1d. The memory space allocation is received by the respective transmitter unit 2 via the terminal 2a. Subsequently, the transmitter unit 2 transmits the data packet via the terminal 2d, this being intermediately stored at the corresponding address, that had been transmitted to the transmitter unit 2 by the receiver unit 1. In response thereto, the transmitter unit 2 informs the memory location manager 3 via the lines 13 that the buffer memory location of the data packet that has been sent is no longer required, whereupon the memory location manager 3 changes the corresponding bit in the occupancy list 10 from "0" to "1". The corresponding parcel of the overall buffer memory 4 can thus be reassigned by the memory location manager 3 to a receiver unit 1 requesting buffer memory capacity.

Figure 4:
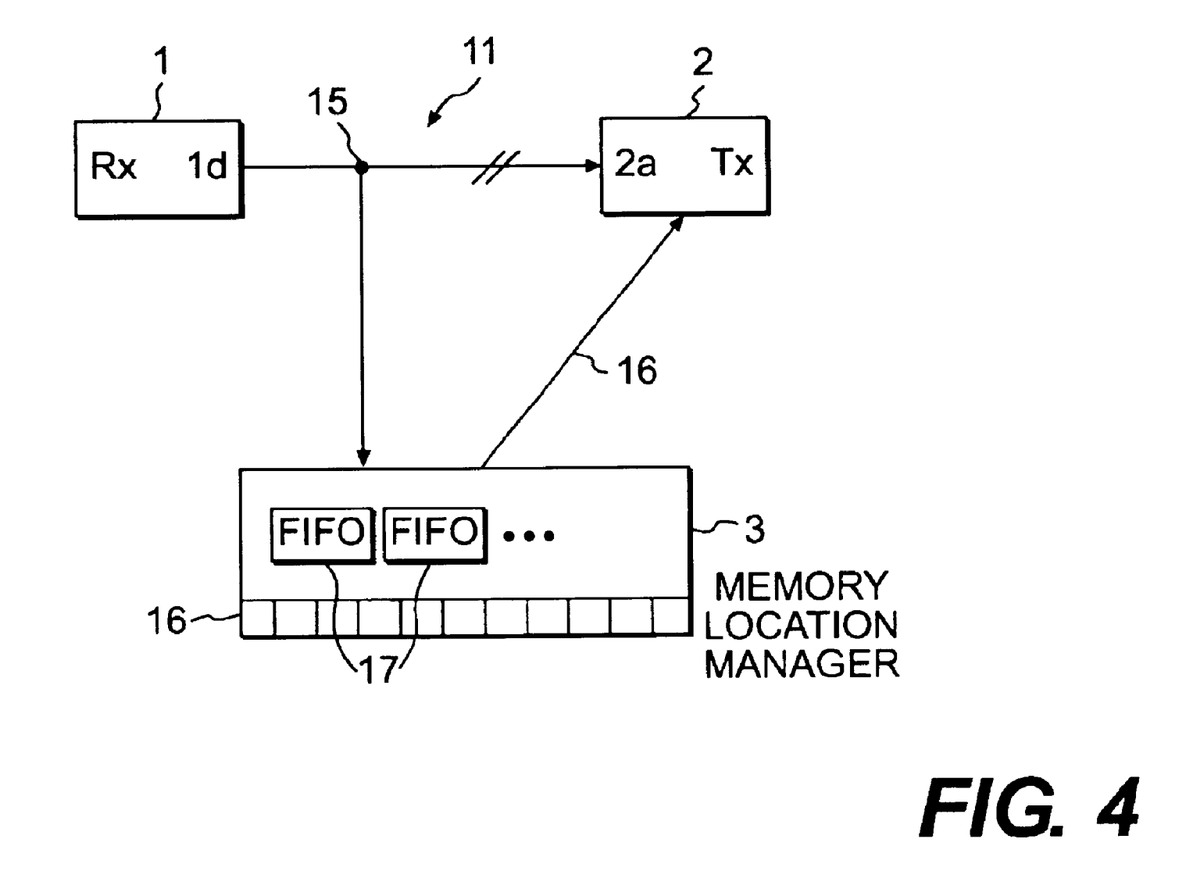
FIG. 4 is a block diagram for explaining an embodiment of the invention.

FIG. 4 shows an embodiment of the inventive method. When a transmitter unit 2 is blocked, so that the receiver units 1 cannot transmit any memory capacity allocations to this transmitter unit 2, this being shown in FIG. 4 by two strokes through the line 11, a node 15 is provided in the line 11. Via this node 15, the signals intended for the transmitter unit 2 can be rerouted to the memory location manager 3. In this case, the receiver unit 1 does not transmit the memory location allocation to the blocked transmitted unit 2 but to the memory location manager 3. What are referred to as FIFO lists are provided for the transmitter units 2 in the memory location manager 3. "FIFO" means that the information that was entered first into the list is also in turn read out first therefrom (first-in-first-out). The memory location manager 3 is connected to the transmitter units 2 via a line 16. When the memory location manager 3 determines that a previously blocked transmitter unit 2 is now no longer blocked, the memory location manager 3 transmits the memory capacity allocations from the FIFO list 17 belonging to the transmitter unit 2 to this transmitter unit 2 in sequence.

As a result thereof, the receiver units 1 are relieved since they can transmit further memory location allocations to transmitter units that are not blocked without being influenced by the blocked transmitter unit 2.

Although modifications and changes may be suggested by those of ordinary skill in the art, it is the intention of the inventors to embody within the patent warranted hereon all changes and modifications as reasonably and properly come within the scope of their contribution to the art.

I claim:

1. A method for transmitting data via a number of interfaces arranged in parallel that respectively comprise a receiver unit for receiving data packets and for intermediately storing these data packets and comprise a transmitter unit for sending data packets, said number of interfaces being connected to an overall buffer memory, said method comprising the steps of:

allocating an original buffer memory capacity of said overall buffer memory to a receiver unit of each interface during an initialization;

transmitting a data packet to a receiver unit of an interface from a communication unit;

intermediately storing said data packet transmitted to said receiver unit in said original buffer memory capacity allocated to said receiver unit;

requesting a further buffer memory capacity for said receiver unit at a memory location manager while said data packet is being stored in said original buffer memory capacity allocated to said receiver unit;

allocating said requested further buffer memory capacity for said receiver unit by said memory location manager;

transmitting said original buffer memory capacity allocation to a transmitter unit;

sending said intermediately stored data packet to said transmitter unit; and releasing said buffer memory capacity of said transmitted data packet and enabling said buffer memory capacity of said overall buffer memory to be re-allocated by said memory allocation manager, wherein said receiver unit further comprises a pointer list for containing said allocated buffer memory capacity and for entering a pointer upon intermediate storage of said data packet transmitted to said receiver unit in said buffer memory capacity, said pointer list indicates where said intermediately stored data packet is stored in said overall buffer memory.

2. The method according to claim 1, wherein said allocated original buffer memory capacity is of a predetermined size to minimize unused memory allocated to said receiver unit.

3. The method according to claim 1, wherein said overall buffer memory comprises divisions of overall buffer memory parcels; and wherein a number of said overall buffer memory parcels are allocated to said receiver units.

4. The method according to claim 1, wherein said receiver unit further comprises a pointer list for containing said allocated buffer memory capacity and for entering a pointer upon intermediate storage of said data packet transmitted to said receiver unit in said buffer memory capacity, said pointer indicating where said intermediately stored data packet is stored in said overall buffer memory.

5. The method according to claim 1, wherein said transmitter unit further comprises a pointer list for entering said buffer memory capacity allocation transmitted from said receiver unit.

6. The method according to claim 1, wherein said pointer list further comprises a status mark having information about a status of segments of a pointer list to which said pointer points, and a length indicator for indicating a length of said intermediately stored data to which said pointer points.

7. The method according to claim 6, wherein said pointer of said pointer list points to a respective overall buffer memory parcel.

8. The method according to claim 3, wherein said data packet is intermediately stored in a number of memory parcels.

9. The method according to claim 8, wherein when said data packet is intermediately stored in a number of overall buffer memory parcels, a buffer memory capacity allocation of a parcel occupied first is only transmitted to said transmitter unit when all data of said data packet covering a number of parcels have been received by said receiver unit.

10. The method according to claim 1, wherein said memory location manager further comprises occupancy lists containing information about occupation of said overall buffer memory and said overall buffer memory parcels of said overall buffer memory.

11. The method according to claim 1, further comprising the steps of:

returning said buffer memory capacity allocation from said receiver unit to said memory location manager when transmission of said buffer memory capacity allocation from said receiver unit to said transmitter unit is not possible;

entering said buffer memory space allocation into a FIFO list in said memory location manager; and after transmitting to said transmitter unit is again possible, transmitting said buffer memory capacity allocation from said FIFO list to said transmitter unit by said memory location manager.

12. The method according to claim 11, wherein said memory location manager further has a FIFO list for each of said number of interfaces.

13. The method according to claim 11, wherein said FIFO list of each interface covers a specific buffer memory capacity location.

14. The method according to claim 11, wherein said buffer memory capacity location for each FIFO list is allocated variably and dependent on said corresponding buffer memory capacity requirement of said respective FIFO list.

15. A method for transmitting data via a number of interfaces arranged in parallel that respectively comprise a receiver unit for receiving data packets and for intermediately storing these data packets and comprise a transmitter unit for sending data packets, said number of interfaces being connected to an overall buffer memory, said method comprising the steps of:
   allocating an original buffer memory capacity of said overall buffer memory to a receiver unit of each interface during an initialization;
   transmitting a data packet to a receiver unit of an interface from a communication unit;
   intermediately storing said data packet transmitted to said receiver unit in said original buffer memory capacity allocated to said receiver unit;
   requesting a further buffer memory capacity for said receiver unit at a memory location manager while said data packet is being stored in said original buffer memory capacity allocated to said receiver unit;
   allocating said requested further buffer memory capacity for said receiver unit by said memory location manager;
   transmitting said original buffer memory capacity allocation to a transmitter unit;
   sending said intermediately stored data packet to said transmitter unit; and
   releasing said buffer memory capacity of said transmitted data packet and enabling said buffer memory capacity of said overall buffer memory to be re-allocated by said memory allocation manager,
   wherein said transmitter unit further comprises a pointer list for entering said buffer memory capacity allocation transmitted from said receiver unit.

16. A method for transmitting data via a number of interfaces arranged in parallel that respectively comprise a receiver unit for receiving data packets and for intermediately storing these data packets and a transmitter unit for sending data packets, said number of interfaces being connected to an overall buffer memory, said method comprising:
   allocating an original buffer memory capacity of said overall buffer memory to a receiver unit of each interface during an initialization; and
   in response to each transmission of a data packet to a receiver unit of an interface from a communication unit:
   intermediately storing said data packet transmitted to said receiver unit in said original buffer memory capacity allocated to said receiver unit;
   requesting a further buffer memory capacity for said receiver unit at a memory location manager while said data packet is being stored in said original buffer memory capacity allocated to said receiver unit;
   allocating said requested further buffer memory capacity for said receiver unit by said memory location manager;
   transmitting said original buffer memory capacity allocation to a transmitter unit;
   sending said intermediately stored data packet to said transmitter unit; and
   releasing said buffer memory capacity of said transmitted data packet and enabling said buffer memory capacity of said overall buffer memory to be re-allocated by said memory allocation manager;
   wherein said receiver unit and said transmitter unit comprise a first second pointer list, respectively.

17. The method of claim 16, wherein the further buffer memory capacity allocated for said receiver unit is approximately the size of the transmitted data packet.

18. The method of claim 16, wherein said memory location manger further comprises occupancy lists containing information about occupation of said overall buffer memory.

19. The method of claim 16, further comprising the steps of:
   returning said buffer memory capacity allocation from said receiver unit to said memory location manager when transmission of said buffer memory capacity allocation from said receiver unit to said transmitter unit is blocked; and
   after transmitting to said transmitter unit is again possible, transmitting said buffer memory capacity allocation to said transmitter unit by said memory location manager.

20. The method according to claim 19, wherein said memory location manager has a FIFO list for each of said number of interfaces, and the buffer memory space allocation is entered into a FIFO list when transmission is blocked.

21. A method for transmitting data via a number of interfaces arranged in parallel that respectively comprise a receiver unit for receiving data packets and for intermediately storing these data packets and a transmitter unit for sending data packets, said number of interfaces being connected to an overall buffer memory, said method comprising the steps of:
   allocating an original buffer memory capacity of said overall buffer memory to a receiver unit of each interface during an initialization;
   transmitting a data packet to a receiver unit of an interface from a communication unit;
   intermediately storing said data packet transmitted to said receiver unit in said original buffer memory capacity allocated to said receiver unit;
   requesting a further buffer memory capacity for said receiver unit at a memory location manager;
   allocating said requested further buffer memory capacity for said receiver unit by said memory location manager;
   transmitting said original buffer memory capacity allocation to a transmitter unit;
   sending said intermediately stored data packet to said transmitter unit; and
   releasing said buffer memory capacity of said transmitted data packet and enabling said buffer memory capacity of said overall buffer memory to be re-allocated by said memory allocation manager,
   wherein said receiver unit further comprises a first pointer list for containing said allocated buffer memory capacity and for entering a pointer upon intermediate storage of said data packet transmitted to said receiver unit in said buffer memory capacity, said first pointer list indicates where said intermediately stored data packet is stored in said overall buffer memory, and
   wherein said transmitter unit further comprises a second pointer list for entering said buffer memory capacity allocation transmitted from said receiver unit.

22. A method for transmitting data via a number of interfaces arranged in parallel that respectively comprise a receiver unit for receiving data packets and for intermedi ately storing these data packets and a transmitter unit for sending data packets, said number of interfaces being connected to an overall buffer memory, said method comprising the steps of:

allocating an original buffer memory capacity of said overall buffer memory to a receiver unit of each interface during an initialization;

transmitting a data packet to a receiver unit of an interface from a communication unit;

intermediately storing said data packet transmitted to said receiver unit in said original buffer memory capacity allocated to said receiver unit;

requesting a further buffer memory capacity for said receiver unit at a memory location manager;

allocating said requested further buffer memory capacity for said receiver unit by said memory location manager;

transmitting said original buffer memory capacity allocation to a transmitter unit;

sending said intermediately stored data packet to said transmitter unit; and releasing said buffer memory capacity of said transmitted data packet and enabling said buffer memory capacity of said overall buffer memory to be re-allocated by said memory allocation manager, wherein said receiver unit further comprises a first pointer list for containing said allocated buffer memory capacity and for entering a pointer upon intermediate storage of said data packet transmitted to said receiver unit in said buffer memory capacity, said first pointer list indicates where said intermediately stored data packet is stored in said overall buffer memory, wherein said transmitter unit further comprises a second pointer list for entering said buffer memory capacity allocation transmitted from said receiver unit, and wherein said transmitter unit and said receiver unit only communicate directly via the first and second pointer lists.

* * * * *